United States Patent
Kakeda

[11] 3,910,680
[45] Oct. 7, 1975

[54] ELECTRICAL OPTICAL MODULATOR

[75] Inventor: Teruyuki Kakeda, Tokyo, Japan

[73] Assignee: Asahi Kogaku Kogyo Kabushiki Kaisha, Tokyo, Japan

[22] Filed: Nov. 5, 1973

[21] Appl. No.: 412,813

[30] Foreign Application Priority Data
Nov. 16, 1972 Japan.............. 47-115299

[52] U.S. Cl............................ 350/160 LC; 350/150
[51] Int. Cl.[2]............................................. G02F 1/16
[58] Field of Search........... 350/160 R, 160 LC, 150

[56] References Cited
UNITED STATES PATENTS
3,694,053  9/1972  Kahn .............................. 350/160 LC
3,741,629  6/1973  Kahn .............................. 350/160 LC OTHER PUBLICATIONS
"Multicolor Matrix-Displays Based on the Deformation of Vertically-Aligned Nematic L. C. Phases, " – Schiekel et al., 6-72, SID Symposium.
"Deformation of Nematic L. C. with Vertical Orientation in Electric Fields," Shiekel et al., 11–71, Applied Physics Letters.
"Liquid Crystal Polychromatic Display Device," Freiser, 7-72, IBM Tech. Disclosure Bul.
"Domains in L. C.," – Williams, 3-63, Journal of Chemical Physics.

Primary Examiner—James W. Lawrence
Assistant Examiner—B. C. Anderson
Attorney, Agent, or Firm—Marn & Jangarathis

[57] ABSTRACT

An electric optical modulator including a nematic liquid crystal cell disposed in the optical path of a polarizer and an analyzer having their planes of polarization at right angles to each other, wherein the thickness of the nematic liquid crystal layer is such that the maximum phase difference (retardation) caused by applying an electric field to the nematic liquid crystal cell is approximately $\pi$.

1 Claim, 6 Drawing Figures

ELECTRICAL OPTICAL MODULATOR

BACKGROUND OF THE INVENTION

This invention relates to a light modulation device employing the double refraction property of a nematic liquid crystal cell, and more particularly relates to an improvement in the response characteristic of such a light modulation device.

A prior art nematic liquid crystal cell is comprised of a nematic liquid crystal having an electric dipole normal to the long axial direction of the crystal molecules and a pair of parallel transparent electrodes having the liquid crystal disposed therebetween in a manner such that the long axial direction of the crystal molecules is normal to the adjacent surfaces of the electrodes. It is a well-known phenomenon that the molecules of a nematic liquid crystal reorientates by application of a DC or AC electric field. It is also known that a nematic liquid crystal is provided with a double refraction property similar to that of a uniaxial crystal and has an optical axis extending in parallel to the long axial direction of the liquid crystal molecules. Consequently, when such a cell is arranged between a polarizer and an anlyzer having their respective planes of polarization at right angles, parallel light projected onto the cell from its optical axial direction is not transmitted through the cell in the absence of an electric field.

If an electric field is applied to the liquid crystal cell so that all the liquid crystal molecules have long axes directed in parallel to the surfaces of the electrodes, then the light emitting from the cell will have a phase difference or retardation $\delta$. Assuming the thickness of a liquid crystal layer is L, the refraction indicies of an ordinary light and extraordinary light is, $n_o$ and $n_e$, respectively, and the wavelength of the incident light is $\lambda$, then the phase difference $\delta$ is expressed by the following equation:

$$\delta = \frac{2\pi L}{\lambda}(n_e - n_o)$$

If the intensity of the incident light is represented by $I_o$ and the angle included between the optical axis of the liquid crystal and the axis of the linearly polarized light from the polarizer by $\phi$, then the intensity of the transmitted light I will be expressed by the following equation:

$$I = I_o \sin^2 2\phi \sin \frac{2\delta}{2}$$

If the liquid crystal cell is so arranged that $\phi = 45°$, then the intensity of the transmitted light I will be, $$I = I_o \sin^2 \frac{\delta}{2}$$

Under these conditions if the incident light is a monochromatic light, the intensity I of the transmitted light will reach its maximum at $\delta = \pi, 3\pi, 5\pi, \ldots$.

It is known that the prior art indication devices having a liquid crystal layer of a given thickness, as hereinafter illustrated, in general exhibit a rather rapid response characteristic upon application of a high voltage, but exhibit an excessively slow rise characteristic at reduced voltages low enough to prevent fluctuation in the intensity of the transmitted light.

OBJECTS OF THE INVENTION

An object of the present invention is to provide an improved nematic liquid crystal cell.

Another object of the present invention is to provide an improved nematic liquid crystal cell which obviates the disadvantages of the prior art.

A still further object of the present invention is to provide an improved nematic liquid crystal cell which exhibits rapid response characteristics with electric fields of diverse voltages.

A further object of the present invention is to provide an improved nematic liquid crystal cell which generates no substantial fluctuations in the intensity of light transmitted through the cell.

SUMMARY OF THE INVENTION

These and other objects of this invention are achieved in a nematic liquid crystal cell by providing a liquid crystal layer for the cell of a thickness such that the phase difference $\delta$ between the incident light and the transmitted light approaches $\pi$.

BRIEF DESCRIPTION OF THE DRAWINGS

A better understanding of the present invention as well as other objects and advantages thereof will become apparent upon consideration of the detailed disclosure thereof, especially when taken with the accompanying drawings, wherein.

DETAILED DESCRIPTION OF THE INVENTION

Figure 1:
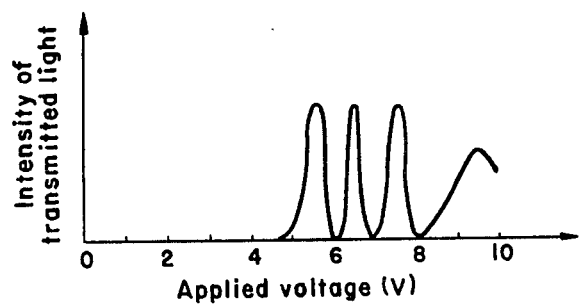
FIG. 1 is a graph illustrating the intensity of light transmitted through a liquid crystal layer having a given thickness, the intensity of the transmitted light being plotted with respect to the applied voltage.
Figure 2:
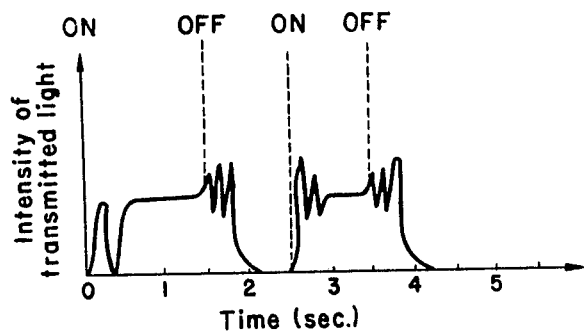
FIG. 2 is a graph illustrating the response characteristic of the nematic liquid crystal cell of FIG. 1 at a time when a relatively high voltage is applied thereto.
Figure 3:
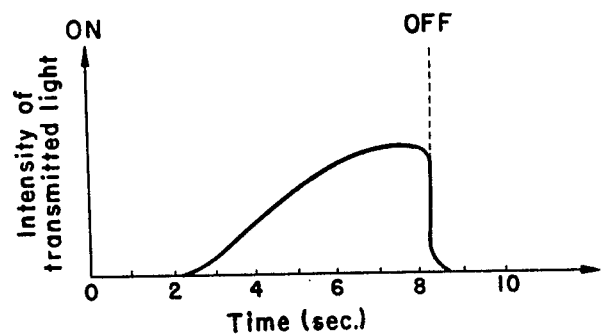
FIG. 3 is a graph illustrating the response characteristic of the nematic liquid crystal cell of FIG. 1 at a time when a relatively low voltage is applied thereto.

It will be appreciated that the intensity of light transmitted through a liquid crystal having a given thickness will have several local maximum values as seen from FIG. 1. The curve of FIG. 1 is the measured intensity of the transmitted light plotted with respect to an applied voltage of 1kHz AC for creating an electric field. In this measurement, the crystal liquid was a mixture of methoxy benzylidene butylaniline (MBBA), and ethoxy benzilidene butylaniline (EBBA). The liquid crystal layer had a thickness of $12\mu$ with the light source being a $H_e$—$N_e$ laser. The response characteristics of the liquid crystal cell are shown in FIGS. 2 and 3. FIG.

2 is the response characteristic curve obtained when a voltage of 9V is applied showing that the intensity of the transmitted light fluctuates for a certain period of time after application of the input signal, and then maintains a constant level until the input signal is removed. FIG. 3 is another response curve obtained by application of a voltage which is low enough to eliminate the fluctuation, for example 5.5V. It will be seen that the curve of FIG. 3 has a longer rise time compared with the curve of FIG. 2.

When a cell having the characteristic as shown in FIG. 2 is utilized in an indicator device, such as a clock or other measuring instrument, a variation appears in the color or light intensity depending on whether the light source be a white light or monochromatic light at the moments when the input signal is switched on and off. Another and more serious disadvantage of the cell of this type is that it has a breaking time in the range from several hundreds of milliseconds to 1 second, which is excessively long for use in an indicator device. On the other hand, a cell having the characteristic as shown in FIG. 3 is not desirable for use in an indicator device because of excessively long rise time which is as long as several seconds. Cells having such response characteristics are also not suitable for use as a device for indicating animated pictures.

Figure 4:
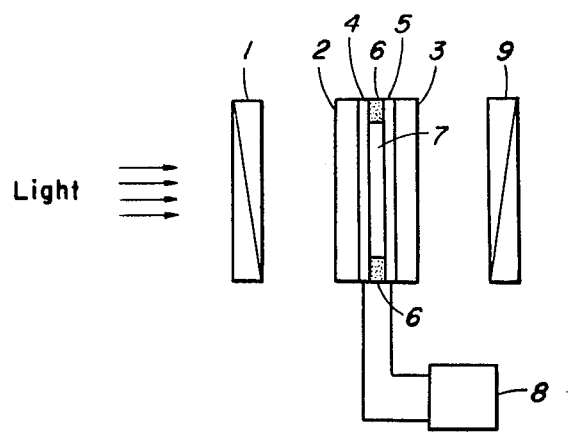
FIG. 4 is a schematic sectional view of the light modulation device according to one embodiment of this invention.

Referring now to FIG. 4, there is schematically illustrated a light modulator device comprised of a polarizer 1, transparent plates 2 and 3, transparent and conductive electrodes 4 and 5, a spacer 6, a nematic liquid crystal 7, a control circuit 8 and an analyzer 9. The electrodes 4 and 5 are connected to the control circuit 8 and are attached to the inner surface of the transparent plates 2 and 3, respectively. The liquid crystal 7 is sandwiched between the electrodes 4 and 5. The polarizer 1 and analyzer 9 are disposed such that their respective planes of polarization are at right angles so that the parallel light projected onto the cell from a direction parallel to the optical axis of the cell is not transmitted therethrough when no electric field is applied to the liquid crystal 7. The thickness L of the crystal 7 is equal to the value which is calculated in accordance with the following equation:

$$l \cong \delta \frac{\lambda}{2\pi(N_e - N_o)} \cong \frac{C\lambda}{2(N_e - N_o)}$$

where the retardation $\delta$ approaches $\pi$, C is an odd numbered miltiple of $\delta/\pi$, $\lambda$ is the particular wave length used, and No and Ne is the particular refractive indicies of the liquid crystals used. The thickness of the crystal 7 may be easily controlled by the spacer 6 using any suitable known coating technique.

Figure 5:
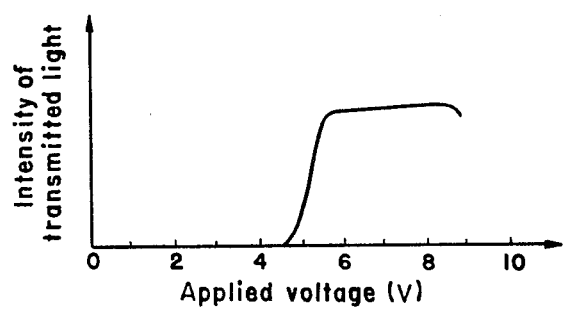
FIG. 5 is a graph illustrating the intensity of the light transmitted through the light modulation device of FIG. 4, the intensity of the transmitted light being plotted with respect to the applied voltage.
Figure 6:
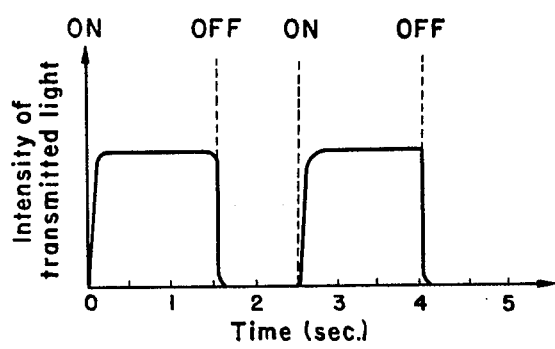
FIG. 6 is a graph illustrating the response characteristic of the light modulation device of FIG. 4.

The light modulation device of FIG. 4 is provided with the characteristics as shown in FIGS. 5 and 6. FIG. 5 represents a curve plotting the measured intensity of the transmitted light with respect to the electric field applied to the cell. In this measurement, the liquid crystal was a mixture of methoxy benzilidene butylaniline (MBBA), and ethoxy benzilidene butylaniline (EBBA), the light source was a $H_e$—$N_e$ laser, the applied electric field was a 1kHz AC and the thickness of the liquid crystal layer was $0.94\mu$ (this was selected on the basis of the wavelength of the light from the light source and the refraction indicies of the liquid crystals used). With a cell having the characteristics as shown in FIG. 5, no fluctuations occured in the intensity of the transmitted light and excellent performance is obtained even when increased voltage is applied to the cell in order to increase the response speed thereof. FIG. 6 illustrates the response characteristic of such a cell upon application of a voltage of 8V.

It is found that a nematic liquid crystal having an electric dipole which is parallel (not normal as stated previously) to the long axial direction of the crystal molecules may also be used in the present invention.

Numerous modifications and variations of the invention are possible in light of the above teachings and therefore the invention may be practiced otherwise than as particularly described.

What is claimed is:

1. In an electric optical modulator including a nematic liquid crystal cell disposed in the optical path of a polarizer and an analyzer having planes of polarization at right angles to each other, the combination comprising:

a nematic liquid crystal layer having an electric dipole normal to the long axial direction of the crystal molecules;

a pair of parallel transparent electrodes having the liquid crystal disposed therebetween in a manner such that the long axial direction of the crystal molecules is normal to the adjacent surfaces of the electrodes;

a control circuit for imposing an electric field to said nematic liquid crystal layer through said pair of parallel transparent electrodes making said nematic liquid crystal layer preferably reorientate;

a spacer controlling the thickness L of said nematic liquid crystal layer in accordance with the following equation, $$l \cong \delta \frac{\lambda}{2\pi(N_e - N_o)} \cong \frac{C\lambda}{2(N_e - N_o)}$$

where the retardation $\delta$ approaches $\pi$, C is an odd numbered miltiple of $\delta/\pi$, $\lambda$ is the particular wavelength used, and No and Ne is the particular refractive indicies of the liquid crystals used.

* * * * *